United States Patent
Ruetschi et al.

(10) Patent No.: US 7,570,163 B2
(45) Date of Patent: Aug. 4, 2009

(54) METHODS AND APPARATUS FOR MANAGING TLS CONNECTIONS IN A LARGE SOFT SWITCH

(75) Inventors: Johannes Ruetschi, Boca Raton, FL (US); Leroy Edwin Gilbert, Wellington, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 866 days.

(21) Appl. No.: 10/953,338

(22) Filed: Sep. 29, 2004

(65) Prior Publication Data

US 2006/0067340 A1    Mar. 30, 2006

(51) Int. Cl.
*G08B 13/14* (2006.01)
(52) U.S. Cl. .............. 340/572.1; 340/539.23; 379/201.1; 726/2; 726/9
(58) Field of Classification Search .......... 340/572.1, 340/539.23; 379/201.06, 201.1; 726/2, 9
See application file for complete search history.

(56) References Cited

U.S. PATENT DOCUMENTS

| | | | | |
|---|---|---|---|---|
| 6,108,701 A * | 8/2000 | Davies et al. | ............... | 709/224 |
| 6,189,105 B1 * | 2/2001 | Lopes | ................... | 726/20 |
| 6,546,096 B1 * | 4/2003 | Meiden et al. | .......... | 379/209.01 |
| 7,068,769 B1 * | 6/2006 | Weaver et al. | ............ | 379/201.1 |
| 7,120,238 B1 * | 10/2006 | Bednarz et al. | ........... | 379/201.1 |
| 2002/0080132 A1 * | 6/2002 | Dai et al. | .................... | 345/212 |

\* cited by examiner

*Primary Examiner*—George A Bugg
*Assistant Examiner*—Samuel J Walk

(57) ABSTRACT

Methods for efficiently establishing TLS connections include detecting the proximity of a user relative to a communication device and establishing a TLS connection between the switch and the communication device based on the proximity of the user. An apparatus according to the invention may include one or more proximity sensors coupled to a presence server, which may be coupled to a soft switch. If proximity of a user is detected, such information may be published as part of a user's availability to a presence server. Publication may be accomplished with any device that has network connectivity. The soft switch may gain access to the presence information by subscribing to the presence server. When proximity is detected, such information may be published to the presence server and a TLS connection may be established by a soft switch.

20 Claims, 1 Drawing Sheet

METHODS AND APPARATUS FOR MANAGING TLS CONNECTIONS IN A LARGE SOFT SWITCH

BACKGROUND OF THE INVENTION

1. Field of the Invention

The invention relates to Internet communications. More particularly, the invention relates to the establishment of Transport Layer Security (TLS) sessions in a large switch.

2. Brief Description of the Prior Art

The Internet is quickly becoming the main line of communications for business and industry. Faxes and telexes have been replaced by email. More recently, voice and video communications via a Public Switched Telephone Network (PSTN) have been replaced by Voice over Internet Protocol (VoIP), instant messaging, and Internet video conferencing.

Traditionally, large enterprises managed telecommunications services via Private Branch Exchange (PBX) switches. These switches were coupled to PSTN offices via Time Division Multiplexed Lines (Trunks) and to hundreds or thousands of individual telephone sets, fax machines, etc. However, more recently, many enterprises have introduced devices that have come to be known as an Internet Protocol (IP PBX) or "soft switch". A high end example of such a device is the Siemens HiPath 8000. It is a high-end enterprise IP PBX that can host more than 100,000 Internet Protocol telephones from a single data center. The HiPath 8000 IP PBX is targeted at very large companies that want to consolidate VoIP deployments into a large data center.

One of the presently preferred protocols for implementing VoIP is TLS. The TLS protocol provides communications security over the Internet. This protocol allows client/server applications to communicate in a way that is designed to prevent eavesdropping, tampering, or message forgery. Implementing TLS in a soft switch requires that each TLS session be provided a unique Transmission Control Protocol (TCP) socket. These sockets are a limited resource. For example, in the Linux operating system, a maximum of 64,000 unique TCP sockets may be established. As indicated above, some soft switches are designed to host more than 64,000 telephone sets. Those skilled in the art will appreciate that it is highly unlikely that all of the hosted telephone sets will be in use simultaneously. Therefore, it is possible to share a limited number of TCP sockets among a larger number of telephone sets. Unfortunately, establishing a socket for a particular telephone set requires a certain amount of time. If a socket is only established upon detecting an off-hook condition in a telephone set, the caller may experience an unacceptable delay before a call may be placed.

SUMMARY OF THE INVENTION

It is therefore an object of the invention to provide a method for establishing TLS connections in a soft switch.

It is also an object of the invention to provide a method for establishing TCP sockets for individual TLS sessions in a soft switch.

It is another object of the invention to provide methods for establishing TCP sockets without unacceptable delay.

It is yet another object of the invention to provide apparatus for establishing TLS connections in a soft switch.

It is still another object of the invention to provide apparatus for establishing TCP sockets for individual TLS sessions in a soft switch.

It is also an object of the invention to provide apparatus for establishing TCP sockets without unacceptable delay.

In accordance with these objects, which will be discussed in detail below, methods according to the invention may include detecting the proximity of a user relative to a telephone set and establishing a TLS connection between the switch and the telephone set based on the proximity of the user. Apparatus according to the invention may include a plurality of proximity sensors coupled to a presence server that may be coupled to the soft switch. The proximity sensors may include any combination of motion detectors, noise detectors, detectors coupled to light switches, detectors coupled to keyboards, Bluetooth detectors, Radio Frequency Identification Detectors (RFID), security badge detectors, location services, etc. If proximity is detected, it may be published as part of a user's availability on the presence server. Publication may be accomplished with any device that has network connectivity. For example, publication devices may include Personal Digital Assistants (PDA's), cellular telephones, personal computers (desktop and laptop), telephones, simple motion detectors in the telephone, RFID detectors in a telephone, etc.). The soft switch gains access to the publication information by subscribing to the presence server. When proximity is detected, it is published to the presence server and the TLS connection is established by the soft switch.

DETAILED DESCRIPTION OF THE INVENTION

Figure 1:
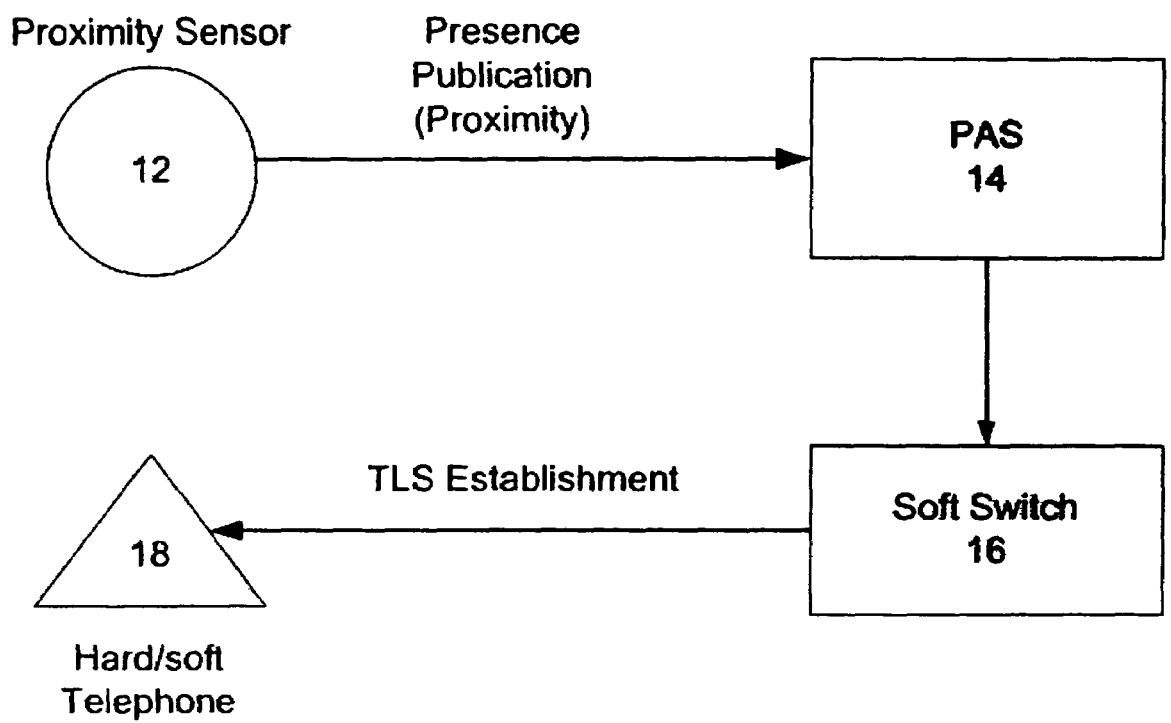
FIG. 1 is a block diagram of a preferred embodiment according to the present invention.

Methods according to a preferred embodiment of the present invention may include detecting the proximity of a user relative to a telephone set (or other communication device utilizing a TLS connection) and establishing a TLS connection between the switch and the telephone set based on the proximity of the user. Methods of detecting may include using motion detectors or noise detectors placed in or near the telephone set. Alternatively, or in addition thereto, a detector coupled to the light switch in the room where the telephone set is located may be used as a proximity detector. That is, when the light is turned on, it is assumed that the room is occupied and when the light is turned off, it is assumed that the room is vacant. Another possible proximity detector is a keyboard monitor. For example, in an office having a PC and a telephone, it may be assumed that if the keyboard of the PC is being used to input data into a PC the office is occupied and a TLS session may be initiated so that the telephone may be used. Still another possible detector may utilize Bluetooth technology to detect the proximity of a potential caller relative to a telephone set. RFID detectors may also be used in a similar manner. Other detectors may be keyed to the caller's security badge, which may also be used in conjunction with RFID and/or Bluetooth technology. Alternatively, if the security badge has a magnetic stripe which must be swiped through a card reader when the caller enters a building, the security control system might then signal the soft switch to establish a TLS session to the caller's office telephone.

According to the presently preferred methods of the invention, once proximity is detected, the potential caller's presence may be published over a local area network to a presence server. Publication may be accomplished with any device that has network connectivity. For example, publication may be accomplished using a PDA, cellular telephone, telephone, personal computer (desktop/laptop), motion detector in a telephone, RFID detector in a telephone, etc. The soft switch preferably gains access to the presence information by subscribing to the presence server. When proximity is detected, it is published to the presence server and the TLS connection is established by the soft switch.

Referring now to FIG. 1, system 10 according to a preferred embodiment of the present invention may include at least one proximity sensor 12 coupled to presence server 14. Soft switch 16 may be coupled to one or more telephone sets 18 (or other communication device that may use a TLS connection). Soft switch 16 subscribes to presence server 14. Proximity sensor 12 may be associated with communication device 18. It will be appreciated that it is not necessary for communication devices 18 and sensors 12 have a 1:1 relationship. It is possible that some communication devices 18 coupled to soft switch 16 will be assigned permanent TLS connections whereas others may share TLS connections that are assigned based on user proximity according to the invention. It will also be appreciated that more than one proximity sensor 12 may be associated with a single communication device 18. For example, multiple sensors may be used to detect proximity when any one of multiple sensors senses proximity or only when all of the sensors detect proximity.

Therefore methods and systems for efficiently establishing TLS connections between communication devices and a soft switch are provided. While particular embodiments of the present invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A method for establishing TLS connections in a soft switch coupled to one or more communication devices, the method comprising the steps of:
   detecting the presence of a user in proximity to the communication device; and
   establishing a TLS connection between the soft switch and the communication device where and when the presence of a user is detected, wherein the soft switch includes a maximum number of unique TCP sockets and, further, hosts a number of communication devices, detects user presences and establishes TLS connections such that a delay for establishing one unique TCP socket for said communication device is not experienced when the communication device is taken off hook.

2. The method according to claim 1, wherein the step of detecting is performed via Bluetooth.

3. The method according to claim 1, wherein the step of detecting is performed by monitoring a light switch.

4. The method according to claim 1, wherein the step of detecting is performed with a badge detector.

5. The method according to claim 1, wherein the step of detecting is performed with a noise detector.

6. The method according to claim 1, wherein the step of detecting is performed by monitoring keyboard input.

7. The method according to claim 1, wherein the step of detecting is performed with a location service.

8. The method according to claim 1, wherein the number of communication devices is greater than said maximum number, presences said method further comprising:
   after the step of detecting the presence of a user and prior to the step of establishing the TLS connection, publishing the presence over a network.

9. The method according to claim 8, wherein the maximum number of unique TCP sockets is 64,000 and the step of publishing is performed with a PDA.

10. The method according to claim 8, wherein the step of publishing is performed with a telephone.

11. The method according to claim 8, wherein the step of publishing is performed with a computer.

12. The system according to claim 1, wherein prior to establishing said TLS connection a Transmission Control Protocol (TCP) socket is not established for said communication device, and establishing said TLS connection establishes a unique TCP socket for said communication device prior to any off hook condition for said communication device.

13. The method according to claim 12, wherein the number of communication devices is greater than said maximum number and the step of detecting is performed with a motion detector.

14. The method according to claim 12, wherein the step of detecting is performed via RFID.

15. A system for establishing TLS connections in a soft switch, said system comprising:
   means for detecting the presence of a user in proximity to at least one communication device of a plurality of communication devices coupled to the soft switch, the soft switch including a maximum number of unique Transmission Control Protocol (TCP) sockets; and
   means for establishing a TLS connection between the soft switch and each at least one of the communication device where the presence of a user is detected and establishing said TLS connection establishes one of the unique TCP sockets for said communication device,
   wherein prior to establishing said TLS connection no TCP socket is established for said communication device such that a delay for establishing the one unique TCP socket is not experienced when the communication device is taken off hook and the means for establishing the TLS connection is being responsive to the means for detecting the presence of the user.

16. The system according to claim 15, further comprising a means for publishing the detected presence of a user over a network, wherein the means for publishing the detected presence of a user is coupled to the means for detecting, and wherein the means for establishing a TLS connection is being responsive to the means for publishing the presence of a user.

17. The system according to claim 16, wherein the number of said plurality of communication devices is greater than said maximum number, and the means for publishing the detected presence of a user includes one or more of a computer and a PDA.

18. The system according to claim 16, wherein said maximum number is 64,000 and is less than the number of said plurality of communication devices, and the means for publishing the detected presence of a user includes a telephone.

19. A system for establishing TLS connections in a soft switch, said system comprising:
   a soft switch including a maximum number of unique Transmission Control Protocol (TCP) sockets and coupled to a second number of communication devices;
   a plurality of detectors for detecting the presence of a user in proximity to the communication devices, said communication devices not having an established TCP socket where the presence of a user is not detected in proximity; and a presence server coupled to the detectors, wherein the soft switch subscribes to the presence server and establishes a unique TCP socket for and, a TLS connection between, the soft switch and the communication device where the presence of a user is detected, wherein a delay for establishing said TCP socket is not experienced when the communication device is taken off hook.

20. The system according to claim 19, wherein the maximum number is less than the number of said plurality of communication devices.

* * * * *